United States Patent [19]

Rauh et al.

[11] Patent Number: 5,401,415
[45] Date of Patent: Mar. 28, 1995

[54] ADSORPTION MATERIAL FOR THE SELECTIVE REMOVAL OF LDL AND/OR VLDL AND METHOD OF USING THEREFOR

[75] Inventors: Andreas Rauh, Kassel; Waltraud Sichler, Melsungen; Gudrun Henke, Melsungen; Wolfgang Feller, Melsungen; Gerold Morsch, Willingshausen; Susan Koch, Gudensberg, all of Germany

[73] Assignee: B. Braun Melsungen AG, Melsungen, Germany

[21] Appl. No.: 955,881

[22] PCT Filed: Jun. 11, 1991

[86] PCT No.: PCT/EP91/01086

§ 371 Date: Dec. 11, 1992

§ 102(e) Date: Dec. 11, 1992

[87] PCT Pub. No.: WO91/19565

PCT Pub. Date: Dec. 26, 1991

[30] Foreign Application Priority Data

Jun. 12, 1990 [DE] Germany .......................... 40 18 778.0

[51] Int. Cl.$^6$ ...................... B01D 15/00; B01D 15/08; C07K 3/18; C07K 3/20
[52] U.S. Cl. ................... 210/660; 210/198.2; 210/502.1; 210/656; 422/70; 436/71; 436/161; 502/405; 530/413; 530/417
[58] Field of Search ................... 210/198.2, 502.1, 635, 210/656, 660; 422/70, 102; 436/71, 161, 178; 502/405; 530/359, 413, 417; 552/544

[56] References Cited

U.S. PATENT DOCUMENTS

| | | | |
|---|---|---|---|
| 4,650,784 | 3/1987 | Ramsden et al. | 210/198.2 |
| 4,773,994 | 9/1988 | Williams | 210/198.2 |
| 4,775,483 | 10/1988 | Mookerjea et al. | 210/670 |
| 4,814,077 | 3/1989 | Furuyoshi et al. | 210/502.1 |
| 4,828,695 | 5/1989 | Yamamura et al. | 210/198.2 |
| 5,203,991 | 4/1993 | Kutsuna et al. | 210/656 |

FOREIGN PATENT DOCUMENTS

| | | |
|---|---|---|
| 0244802 | 11/1987 | European Pat. Off. . |
| 0295808 | 12/1988 | European Pat. Off. . |
| 2426698 | 12/1975 | Germany . |

*Primary Examiner*—Sun Uk Kim
*Attorney, Agent, or Firm*—Nikaido, Marmelstein, Murray & Oram

[57] ABSTRACT

An adsorption material for selectively removing Lp(a) lipoprotein, LDL cholesterol and/or vLDL cholesterol from aqueous liquids, in particular from blood, plasma or serum, consisting of porous glass beads as the solid carrier material whose silanol groups present on its surface carry ligands which are covalently bound and have alkyl residues with 4 to 12 atoms containing at least one ether group and a terminal $\alpha,\beta$-diol group containing alkyl residues with 4 to 12 C atoms and wherein the material has no free silanol groups. Also disclosed is a method of using the adsorption material for selective removal or determination of Lp(a) lipoprotein, LDL cholesterol or/and vLDL cholesterol from aqueous liquids, and a device for use in such methods.

24 Claims, 1 Drawing Sheet

1-HYDROXYETHYL-3-OXYBUTYL-BIORAN-
DISILOXANE

1:1 MIXTURE OF 1-HYDROXYETHYL-3-OXYBUTYL/
GLYCIDOXYPROPYL-BIORAN-DISILOXANE

MIXTURE OF 1-HYDROXYETHYL-3-OXYBUTYL/
1.2-DIHYDROXYPROPYL-3-OXYPROPYL-

ADSORPTION MATERIAL FOR THE SELECTIVE REMOVAL OF LDL AND/OR VLDL AND METHOD OF USING THEREFOR

DESCRIPTION

The invention concerns an adsorption material and a process for removing LDL cholesterol or/and vLDL cholesterol or/and Lp(a) lipoprotein from aqueous liquids such as plasma or serum, a method for the determination of the concentration of LDL cholesterol or/and vLDL cholesterol or/and Lp(a) lipoprotein in liquids as well as a device for the said methods.

The selective elimination of LDL or/and Lp(a) lipoprotein and/or fibrinogen from human blood is desirable for medical reasons in particular for treating a severe familial hypercholesterolaemia and atherosclerosis (Trans. Am. Soc. Artig. Intern. Organs. (1986) 17, 104–107). The familial hypercholesterolaemia is the most dangerous type of hyperlipidaemia. When present in its homozygotic form the affected persons are already in danger of becoming diseased in their youth (and even at a child's age) and dying from severe and rapidly progressing coronary angiopathy (Plasma Sep. and Plasma Frac. 272–280 (Karger Basel, 1983)).

Previous treatments for severe hypercholesterolaemia have proven to be unsatisfactory. This applies to the various types of diet as well as to drug therapy. Therefore one has tried to tackle the severe metabolic disorders by means of extracorporeal removal of atherogenic lipoprotein fractions (very low density and low density lipoproteins, vLDL and LDL) from blood. The aim of an extracorporeal method of treatment is to achieve a total cholesterol level and LDL cholesterol level in the range $<200$ mg/dl and $<130$ mg/dl respectively (Klin. Wochenzeitschrift (1987) 69, 161–168; GIT Labor Medizin (1989) 9, 386–395).

The elimination of LDL cholesterol is at present carried out with three different extracorporeal methods. Apart from a cascade filtration (Artherosclerosis 60, 23–37 (1988), Artherosclerosis 73, 197–202 (1988), LDL cholesterol can be eliminated by precipitation with heparin in an acidic pH range (HELP method=heparin induced extracorporeal LDL precipitation) (Klin. Wochenschrift 65, 161–168 (1987), EP 0 166 324, DE 33 10 727).

The third method of eliminating LDL cholesterol from blood or plasma is adsorption to suitable carrier materials. Thus for example monoclonal and/or polyclonal antibodies which specifically bind the LDL cholesterol can be coupled to a porous polyanionic carrier material (J. Clin. Apheresis 4, 59–65 (1988), Proc. Natl. Acad. Sci. USA 78, 611–615 (1981), JP 60239425). In addition to antibodies, porous polyanions such as heparin (DE 36 17 672, U.S. Pat. No. 4,637,944, U.S. Pat. No. 4,103,685) and synthetic oligoanions or polyanions such as sulfated polysaccharides (EP 0 110 409, EP 0 225 867, EP 143 369, U.S. Pat. No. 4,096,136, U.S. Pat. No. 4,603,010) have been bound to carrier materials and investigated for specific LDL adsorption from plasma or blood. Cellulose, organic polymerisates, coated silica gels and agarose have been described as a carrier matrix for binding the described substances.

The results attained up to now with the described adsorption materials are, however, inadequate for the purpose of adsorbing LDL to a matrix in an extracorporeal perfusion system in a medical and therapeutic context since either the binding capacity and/or the selectivity of these materials for LDL does not meet the practical requirements and/or physiological protective mechanisms (e.g. coagulation system, complement system) are activated. (Artheriosclerosis 73, 143–148 (1988), "Schweiz. med. Wschr." 119, 55–58 . (1989)).

The object of the present invention was therefore to provide materials which enable the removal of artherogenic lipoprotein fractions from aqueous liquids, in particular from whole blood, plasma and serum, and at the same time fulfil the requirements for a simple and safe application in an extracorporeal perfusion system for humans. These requirements are for example capability of sterilization with steam, heat or γrays, minimal release of particles in the micrometre range, no release of toxic constituents and a sufficiently high flow rate through the materials in the range up to 200 ml/min, high specific selectivity and maximal capacity for the molecules to be eliminated. Apart from the cited criteria, this perfusion system or the material should bind rapidly in a kinetic binding reaction with the molecules to be bound.

This object is achieved according to the present invention by an adsorption material for the selective removal of LDL cholesterol or/and vLDL cholesterol from aqueous liquids, in particular from blood, plasma or serum, consisting of glass beads which have pores as the solid carrier material with organic functional groups as ligands which are covalently bound via silanol groups present on their surface which is characterized in that it has alkyl residues with 4 to 12 C atoms containing at least one ether group and a terminal $\alpha,\beta$-diol group as the ligands and that no free silanol groups are present.

The glass beads used as a carrier in the adsorption material according to the present invention include glass beads, i.e. glass balls of a particular size composed of a silicon dioxide phase with residual amounts of boric acid and alkali oxide, and glass membranes in the form of hollow fibres. Glass beads are for example described in DE-A 24 54 111 and in DE 24 62 567. The adsorption material according to the present invention, however, differs from the commercially available variants (Controlled Pore Glass, Nature 206 (1969) 693–696, supplier for example Dow Corning, Electro Nucleonics, Waiko Industries) in that all freely accessible silanol groups have been substituted by organic functional residues. The specific elimination of silanol groups prevents unspecific binding of proteins. Adsorber materials based on pure CPG (Controlled Pore Glass) with completely or partially intact silanol groups exhibit undesired HDL binding properties (see example 1). In contrast it surprisingly turned out that the adsorption materials substituted according to the present invention in which all of the silanol groups are substituted, of which at least one position is substituted by an ether group which may be followed by a terminal $\alpha,\beta$-diol group, are able to bind LDL cholesterol and vLDL cholesterol and Lp(a) lipoprotein with a previously unachievable kinetic reaction, selectivity and binding capacity.

In a preferred embodiment of the invention the ligands correspond to the general formula I

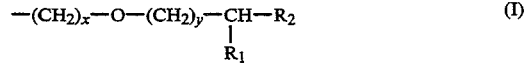

in which x and y are integers from 1 to 5,
$R_1$ denotes H or OH and
$R_2$ denotes $CH_2OH$ if $R_1$ is OH.

Particularly preferred ligands are the 1,2-dihydroxypropyl-3-oxypropyl residues.

All silanol groups of the adsorption material according to the present invention can be substituted with the said ligands according to the present invention. It is, however, also possible that it has other ligands apart from the said ligands. In a preferred embodiment of the present invention the adsorption material has compounds of the general formula II as further ligands

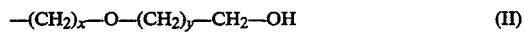

$$-(CH_2)_x-O-(CH_2)_y-CH_2-OH \quad (II)$$

in which x and y denote integers from 1 to 5. In this case particularly preferred ligands of formula II according to the present invention are 1-hydroxy ethyl-3-oxybutyl residues and 1-hydroxypropyl-3-oxypropyl residues.

Further preferred ligands which can be present in the adsorption material according to the present invention are compounds of the general formula III

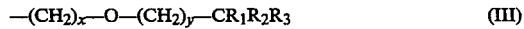

$$-(CH_2)_x-O-(CH_2)_y-CR_1R_2R_3 \quad (III)$$

in which $R_1$ denotes a methoxy residue and $R_2$ and $R_3$ denote H or a methoxy residue and x and y denote integers from 1 to 5. In this case a 1,1-dimethoxyethyl-3-oxypropyl residue is particularly preferred.

If ligands of the general formula I as well as those of the formulae II and III are present in the adsorption material according to the present invention it is preferred that these are bound to the carrier material via the silanol groups in a ratio of about 1.3:1:0.8.

The adsorption materials according to the present invention preferably have a surface between 30 and 300 $m^2/g$ depending on the porosity. One of their features is the ability to sterilize them with superheated steam.

The degree of coating of the carrier material with ligands is preferably 2 to 4 $\mu mol/m^2$ which also depends on the porosity of the material used.

The pore diameter of the glass beads in the adsorption material according to the present invention is larger than that of the LDL cholesterol and vLDL cholesterol molecules which are to be adsorbed, thus it is more than 30 nm.

It is preferred that the glass beads used have a particle diameter of 60 to 250 $\mu m$ and a pore diameter of 50 to 150 nm.

The invention also concerns a process for the production of an adsorption material according to the present invention in which the desired ligands are coupled by means of a silylation reaction to the SiOH groups of the glass beads via a disiloxane bond -Si-O-Si-L in which L denotes the ligands. This silylation reaction is described by Shung et l. (J. of Chrom. 120 (1976) 321-333). Starting materials which can be used according to the present invention are supplied by the manufacturers Schott, Mainz FRG; Dow Corning, Electro Nucleonics and Waiko Industries among others and are referred to as Bioran glass carrier materials or Controlled Pore Glass (CPG) carriers. In a preferred embodiment of the invention γ-glycidoxypropyltri-methoxysilane and a silanol-Bioran carrier in the form of glass beads are used for the silylation reaction and glycidoxypropyl-Bioran-disiloxane is obtained and this product is subjected to an acidic treatment during which the epoxide residue opens to yield the particularly preferred ligand according to the present invention the 1,2-dihydroxypropyl-3-oxypropyl residue, which is bound as a disiloxane group.

The reaction of the intact silanol groups with γ-glycidoxypropyltrimethoxysilane is carried out according to the aforementioned procedure for the silylation reaction.

The adsorption materials synthesized and used according to the invention exhibit excellent properties in that they selectively and quantitatively bind LDL cholesterol and vLDL cholesterol and also Lp(a) lipoprotein without at the same time eliminating HDL cholesterol.

The invention also concerns a process for removing LDL cholesterol or/and vLDL cholesterol from aqueous liquids, in particular blood, plasma or serum in which the liquid is passed over an adsorption material according to the present invention. A further application of the adsorption material according to the present invention and thus a further subject matter of the invention is a method for the determination of the concentration of LDL cholesterol or/and vLDL cholesterol in aqueous liquids, in particular blood, plasma or serum which is characterized in that LDL cholesterol and vLDL cholesterol are separated chromatographically from the liquid with the aid of an adsorption material according to the present invention and after elution from the adsorption material their concentration is determined according to known methods. In this connection it is preferred that the elution is carried out with high molecular saline solution, a glycerol-water mixture or a urea solution (example 10).

A characteristic of the materials according to the present invention compared to comparable materials is that they bind LDL and vLDL with a kinetic reaction, selectivity and binding capacity (>20 mg LDL per ml adsorbent) which was hitherto unachievable, that they eliminate these components not only from plasma or serum but also directly from stabilized whole blood with high efficiency and that they do not activate any physiological protective mechanisms (e.g. coagulation system, complement system) by unspecific adsorption of the corresponding components (example 10 and 11).

Furthermore the invention provides a device for the extracorporeal removal of LDL cholesterol or/and vLDL cholesterol from aqueous liquids, in particular from blood, plasma or serum, wherein this device is composed of a cylindrical housing which is filled with an adsorption material according to the present invention and the ends of which are provided with covers which each have central inflow or outflow pipes. This cylindrical housing preferably has a diameter of 3 to 20 cm, preferably of 5 to 10 cm and a length of 1 to 40 cm, preferably of 10 to 20 cm. The preferred material for the housing is glass or plastic (example 10 and 11).

In a further preferred embodiment of the device according to the present invention the cover on the inflow side of the housing has a sieve with a pore size of 10 to 300 $\mu m$, preferably 20 to 100 $\mu m$. This prevents blockage of the device by larger particles present in the aqueous liquid. The device according to the present invention can be sterilized in a packaging by means of γ-radiation or by heat and is thus particularly suitable for use in an extracorporeal perfusion system. It can, however, also be used practically as a chromatography column, in particular in order to determine the LDL cholesterol and/or vLDL cholesterol concentration according to the present invention.

In a particularly preferred embodiment of the invention the housing of the device is integrated in a closed circuit in which the aqueous liquid is circulated by means of a pump. It is particularly preferable to equip the device with two cylindrical housings (two adsorption capsules) which can be alternately turned on by means of valves and which can be rinsed with the aqueous liquid which is to be treated in a closed circuit by means of a pump. The capsule which has not been rinsed and is saturated with LDL or vLDL is eluted with a regeneration solution which is preferably a high molecular saline solution, glycerol-water mixture or a urea solution.

The device according to the present invention can also be integrated in the dialysis liquid circulation in a dialyzer in order to regenerate the dialysis liquid in combination with other adsorbers.

It is intended to further elucidate the invention with the following examples in conjuction with the figures.

EXAMPLE 1

Comparative example

Figure 1A:
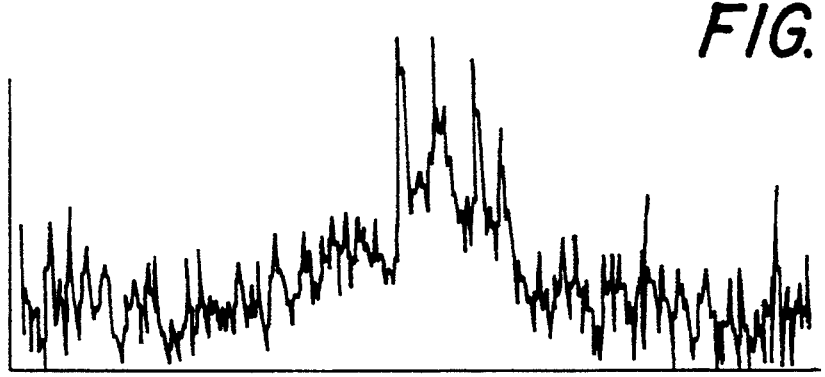
FIG. 1(A-C) shows solid-state C-13 NMR spectra of Bioran glass materials with various ligands.

Test of the adsorption selectivity and capacity of native CPG glasses.

Adsorbent

CPG 500 glass (Serva, Heidelberg) with a pore diameter of 50 nm (contains free, non-reacted silanol groups as the surface).

Experimental procedure

The adsorbent is washed with redistilled water over a G3 nutsch filter, filled in a disposable chromatography column (5×70 mm) and subsequently equilibrated with 100 ml 50 mM Tris-Cl pH 7.6 (resin volume 1.6 ml/column height 8 cm).

6 ml human plasma (stabilized with 3 units Na heparin/B. Braun Melsungen AG per ml) is applied to the column at room temperature and pumped through the column (rate of flow 0.5 ml/min). After 2 ml of pre-eluate, a 600 µl fraction was taken from each of the following millilitres of eluate, the remaining "intermediate eluates" (each of these is 400 µl up to the next individual fraction based on complete ml) are collected separately in a vessel and thus combined to a mixture (1.6 ml in each case: at a volume flow of 6 ml).

The eluates 2, 3, 4, 5 and 6 ml were used as assessment parameters for the kinetic time courses of adsorption capacity. The intermediate eluates combined in the mixture were examined as a selectivity "screening criterium" for the selectivity of individual synthesized adsorber material. Total cholesterol, HDL, LDL and protein content was determined in the eluates (cholesterol oxidase PAP test, cholesterol oxidase iodide test and biuret test).

TABLE 1

| | CPG 500 (with free silanol groups) | | |
|---|---|---|---|
| | Initial plasma (mg/dl) | Mixture of the intermediate eluates (mg/dl) | Adsorption capacity (%) |
| Total cholesterol | 217 | 147 | 32 |
| HDL cholesterol | 41 | 7 | 83 |
| LDL cholesterol | 153 | 119 | 22 |

TABLE 1-continued

| | CPG 500 (with free silanol groups) | | |
|---|---|---|---|
| | Initial plasma (mg/dl) | Mixture of the intermediate eluates (mg/dl) | Adsorption capacity (%) |
| Total protein | 7 | 6.3 | 10 |

The adsorption capacity in % may be calculated from:

$$\text{Adsorption capacity} = \frac{\text{Initial plasma} - \text{mix} \cdot \text{intermediate eluates} \times 100}{\text{initial plasma}}$$

As shown by Table 1, native CPG 500 glass with non-reacted silanol groups is capable of binding total cholesterol. Since, however, the HDL cholesterol is quantitatively eliminated this qualifies the LDL binding capacity. The elimination of HDL cholesterol has to be regarded as a major disadvantage.

EXAMPLE 2

Primary carrier

Test of the total cholesterol adsorption capacity of glass beads coated with 1-aminoethyl-3-oxybutyl groups or alternatively with 1-hydroxyethyl-3-oxybutyl-/glycidopropyl groups (ratio 1:1) (manufacturer's name $NH_2$- and -OH/epoxide-hydrophilic Bioran glass, Schott Co. Mainz) 100/130/250, the pore size depending on the species is 100-200 nm, the particle size is 60-280 µm).

Experimental procedure

Analogous to example 1: The total cholesterol binding properties of all the initial materials used are shown in Table 2.

TABLE 2

| | Total cholesterol content | | |
|---|---|---|---|
| | Initial plasma (mg/dl) | Mixture of the intermediate eluates (mg/dl) | Adsorption capacity (%) |
| —OH/epoxide hydrophilic Bioran 100 (manufacturer's name) | 249 | 225 | 10 |
| —OH/epoxide hydrophilic Bioran 130 (manufacturer's name) | 249 | 167 | 32 |
| —OH/epoxide hydrophilic Bioran 250 (manufacturer's name) | 217 | 219 | — |
| —$NH_2$ hydrophilic Bioran 100 (manufacturer's name) | 249 | 90 | 64 |
| —$NH_2$ hydrophilic Bioran 130 (manufacturer's name) | 249 | 99 | 60 |
| $NH_2$ hydrophilic Bioran 250 (manufacturer's name) | 249 | 100 | 60 |

The binding capacities for total cholesterol shown in Table 2 is relatively high for the Bioran glass beads substituted with $NH_2$ groups, however, this species quantitatively absorbs the HDL cholesterol (data not shown). For these reasons the "glass beads" modified with $NH_2$ can only be used for reactions with various ligands.

EXAMPLE 3

Primary carrier and acid

Immobilization of organic functional groups on Bioran "glass beads" and a test for the adsorption capacity of the synthetic adsorption materials.

Adsorbent

"Glass beads" were used as the starting material for the immobilization reaction analogous to example 2 (Schott Co. pore size, particle size see example 2), these are reacted with sulphuric acid. The epoxide group is opened in this process to form in each case a 1,2-dihydroxypropyl-3-oxypropyl group.

6 g in each case of wet Bioran 100, 130 and 250 glass beads (see example 2) with -$CH_2OH$ groups and epoxide groups (ratio 1:1) is shaken (100 rpm) for 3 days at 40° C. with 1N $H_2SO_4$. The adsorbent is subsequently washed with 10 parts by volume distilled water on a G3 filter and taken up in the respective equilibration buffer.

Experimental procedure

Analogous to example 1: The total cholesterol binding properties of some synthesized adsorption materials are shown in Table 3.

TABLE 3

Total cholesterol determination of synthetic products derived from Bioran "glass beads"

| | Initial plasma (mg/ml) | Mixture of the intermediate eluates (mg/ml) | Adsorption capacity (%) |
|---|---|---|---|
| 1,2-dihydroxypropyl-3-oxypropyl-Bioran-disiloxane 100 | 217 | 126 | 42 |
| 1,2-dihydroxypropyl-3-oxypropyl-Bioran-disiloxane 130 | 217 | 93 | 57 |
| 1,2-dihydroxypropyl-3-oxypropyl-Bioran-disiloxane 250 | 217 | 97 | 55 |

Comment: the table above described the materials which were tested only with the reacted active group. Apart from the 1,2-dihydroxy-3-oxypropyl residues, 1-hydroxyethyl-3-oxypropyl residues and 1,1-dimethoxyethyl-2-oxypropyl residues are also bound in a ratio of (1.3:1:0.8) (see example 8).

All Bioran "glass beads" covered with the functional group according to the present invention have excellent binding properties. Unlike the $NH_2$-Bioran modified "glass beads" and the CPG 500 glass (see examples 1 and 4), the materials are not able to bind HDL.

EXAMPLE 4

Comparative review of several clinically relevant parameters using the selected adsorbent material 1,2-dihydroxyethyl-3-oxpropyl/1-hydroxyethyl-3-oxybutyl/1,1-dimethoxyethyl-2-oxypropyl-Bioran-disiloxane (ratio 1.3:1:0.8).

The relevant clinical parameters of the above-mentioned Bioran-disiloxane species (ratio 1.3:1:0.8) 100/130 are shown in tables 4 and 5 (see examples 1-3).

TABLE 4

1-hydroxyethyl-3-oxybutyl/1,2-dihydroxy-3-oxypropyl/1,1-dimethoxyethyl-2-oxypropyl-Bioran-disiloxane (ratio 1:1.3:0.8) 100

| | Initial plasma (mg/ml) | Mixture of the intermediate eluates (mg/ml) | Adsorption capacity (%) |
|---|---|---|---|
| Total cholesterol | 217 | 126 | 42 |
| LDL cholesterol | 153 | 66.6 | 56.5 |
| HDL cholesterol | 41 | 41 | — |
| Triglycerides | 117 | 92 | 21.4 |
| Total protein | 7 (g/dl) | 6.9 (g/dl) | 1.5 |

TABLE 5

1-hydroxyethyl-3-oxybutyl/1,2-dihydroxy-3-oxypropyl/1,1-dimethoxyethyl-2-oxypropyl-Bioran-disiloxane (ratio 1:1.3:0.8) 130

| | Initial plasma (mg/ml) | Mixture of the intermediate eluates (mg/ml) | Adsorption capacity (%) |
|---|---|---|---|
| Total cholesterol | 217 | 93 | 57 |
| LDL cholesterol | 153 | 38.4 | 75 |
| HDL cholesterol | 41 | 39 | 4.9 |
| Triglycerides | 117 | 78 | 33.3 |
| Total protein | 7 (g/dl) | 6.7 (g/dl) | 4.2 |

The adsorption materials described in example 4 exhibit a high selectivity and adsorption capacity for LDL cholesterol. Neither HDL cholesterol nor total protein is bound by the adsorption material. None of the kinetic experiments shows a saturation of the material after passage of 6 ml plasma.

EXAMPLE 5

Test of the adsorption selectivity and capacity of "glass beads" with 1-hydroxyethyl-3-oxybutyl-/1,2-dihydroxy-3-oxypropyl-Bioran-disiloxane using whole blood.

Adsorbent 1-hydroxyethyl-3-oxybutyl/1,2-dihydroxy-3-oxypropyl-Bioran-disiloxane (ratio 1:1.3) 100/130 as the adsorbent is tested with whole blood.

Experimental procedure

The experimental procedure only differs from example 1 (plasma stabilized with heparin) in the selection of whole blood (stabilized with 3 IU/ml heparin-sodium B. Braun Melsungen AG).

The results of the experiments with whole blood are shown in Table 6.

TABLE 6

1-hydroxy-3-oxybutyl/1,2-dihydroxy-3-oxypropyl-Bioran-disiloxane (ratio 1:1.3) 100/130

| | Initial plasma (mg/ml) | Mixture of the intermediate eluates (mg/ml) | Adsorption capacity (%) |
|---|---|---|---|
| 1-hydroxyethyl-3-oxybutyl-/1,2-dihydroxy-3-oxypropyl-Bioran disiloxane 100 | 221 | 100 | 55 |
| 1-hydroxyethyl-3-oxybutyl-/1,2-dihydroxy-3-oxypropyl-Bioran disiloxane 130 | 221 | 70 | 68 |

The adsorption materials described according to the present invention are able to eliminate considerably more than 50% of the total cholesterol from whole blood. When the blood is passed through the column no haemolysis reaction occurs.

EXAMPLE 6

Synthesis of porous "glass beads" and test for the adsorption capacity of the synthesized adsorber species using human plasma.

12 ml 3-glycidoxypropyltrimethoxysilane (Sigma Co., Heidelberg) is added dropwise to 200 ml demineralized water while stirring and monitoring the pH with a glass electrode, during this the pH of the mixture was kept between 5.5 and 5.8 by dropwise addition of $10^{-3}$N KOH (consumption about 30 ml). Sufficient water was added to result in a 5% solution. The silylation mixture was immediately processed further.

200 ml (100 ml) of the silylation mixture was poured over 25 g native Bioran glass 100 (Schott Co., pore size 100 nm, particle size 100 μm) in a 1 l round-bottomed flask and degassed for ca. 1 min in a water jet vacuum while shaking. Subsequently the mixture is aerated and heated to 90° C. as quickly as possible in a preheated oil bath (ca. 10 min heating time). It was kept at this temperature for 30 min while swirling and then it was cooled as quickly as possible, suction filtered on a Büchner funnel and washed with copious demineralized water. It was then washed again 3 times with 150 ml acetone in each case and suction filtered until the residue was no longer cold. The fine powder was dried in a vacuum (20 h at 20 hPa, 24 h at 2 Pa) and weighed. 25 g glycidoxy-3-propyl-Bioran-disiloxane 100 is obtained even with possible losses during transfer.

6 g wet glycidoxy-3-propyl-3-Bioran-disiloxane 100 "glass beads" were shaken for 3 days at 40° C. with 1N $H_2SO_4$ (100 rpm). The adsorbent was subsequently washed in a G3 filter with 10 parts by volume distilled water and taken up in equilibration buffer.

Experimental procedure

Analogous to example 1: Table 7 shows the relevant clinical parameters of a column experiment with human plasma using the synthesized adsorption medium 1,2-dihydroxypropyl-3-oxypropyl-Bioran-disiloxane.

TABLE 7

Human plasma passed over the adsorber material 1,2-dihydroxypropyl-3-oxypropyl-Bioran-disiloxane

|  | Initial plasma (mg/ml) | Mixture of the intermediate eluates (mg/ml) | Adsorption capacity (%) |
| --- | --- | --- | --- |
| Total cholesterol | 225 | 120 | 46.6 |
| LDL cholesterol | 152 | 58 | 61.8 |
| HDL cholesterol | 33 | 33 | — |
| Triglycerides | 115 | 89 | 22.6 |

As documented in Table 7 the adsorption medium exhibits excellent selectivity and adsorption capacity properties for the relevant lipid parameters.

EXAMPLE 7

Clinical-biochemical routine diagnostics of human plasma fractions passed over porous "glass beads".

Adsorbent

Adsorption material (Bioran "glass beads" pore size 120 nm, particle size 130 μm analogous to example 2) was synthesized analogous to example 3 and coated with organic functional spacer arms comprising 1,2-dihydroxypropyl-3-oxypropyl residues, 1-hydroxyethyl-3-oxypropyl residues and 1,1-dimethoxyethyl-2-oxypropyl residues in a ratio of 1:1.3:0.8 and tested in a plasma experiment.

Experimental procedure

Analogous to example 1. All the relevant clinical-biochemical diagnostic parameters of the plasma fractions passed over the adsorption material are shown in Table 8.

TABLE 8

|  | Column fraction | | | | | |
| --- | --- | --- | --- | --- | --- | --- |
|  | 1 | 2 | 3 | 4 | 5 | 6 |
| Sodium mmol/l | 143 | 127 | 135 | 139 | 142 | 142 |
| Potassium mmol/l | 4.0 | 3.0 | 3.6 | 3.8 | 3.9 | 3.9 |
| Calcium mg/dl | 9.5 | 8.6 | 8.9 | 8.8 | 9.4 | 9.1 |
| in.phosphorus mg/dl | 3.2 | 3.0 | 3.0 | 3.2 | 3.1 | 3.4 |
| Chloride mmol/l | 102 | 96 | 100 | 101 | 102 | 102 |
| Creatinine mg/dl | 1.0 | 0.9 | 0.9 | 1.0 | 1.0 | 0.9 |
| Urea-N mg/dl | 14 | 13 | 14 | 14 | 14 | 15 |
| Glucose mg/dl | 98 | 88 | 90 | 91 | 94 | 94 |
| Total protein g/dl | 6.9 | 6.4 | 6.5 | 6.6 | 6.7 | 7.0 |
| Albumin g/dl | 4.5 | 4.3 | 4.3 | 4.4 | 4.3 | 4.4 |
| Total bilirubin mg/dl | 0.4 | 0.4 | 0.4 | 0.4 | 0.4 | 0.4 |
| LDH U/l | 136 | 132 | 128 | 128 | 129 | 136 |
| Amylase U/l | 21 | 21 | 20 | 20 | 21 | 21 |
| Iron μg/dl | 100 | 88 | 87 | 87 | 87 | 89 |
| IgG g/l | 12.8 | 12.3 | 12.4 | 12.3 | 12.6 | 12.7 |
| IgA g/l | 2.5 | 2.4 | 2.4 | 2.4 | 2.4 | 2.5 |
| Igm | 1.7 | 1.5 | 1.5 | 1.5 | 1.6 | 1.6 |
| C-3 compl. % | 59 | 51 | 49 | 48 | 51 | 53 |
| C-4 compl | 21 | 20 | 19 | 19 | 20 | 21 |
| C-1 inact. % | 28 | 11 | 21 | 24 | 22 | 21 |
| AT III % | 111 | 104 | 102 | 107 | 101 | 102 |
| Haemoglobin mg/dl | 13 | 10 | 10 | 9 | 10 | 11 |
| Heparin iu/ml | 8.25 | 6.4 | 6.9 | 6.6 | 6.55 | 6.85 |
| Tot. chol. mg/dl | 196 | 56 | 62 | 62 | 67 | 83 |
| Tot. TG. mg/dl | 69 | 20 | 26 | 32 | 37 | 44 |
| LDL chol. mg/dl | 121 | 0 | 0 | 0 | 0 | 11 |
| HDL chol. mg/dl | 68 | 56 | 62 | 62 | 62 | 66 |
| Apo A 1 mg/dl | 156 | 146 | 151 | 152 | 150 | 160 |
| Apo B mg/dl | 106 | <20 | <20 | <20 | <20 | <20 |
| Lp(a) mg/dl | 24.5 | 1.85 | 2.0 | 2.65 | 4.1 | 6.6 |

TABLE 8-continued

|  | Column fraction | | | | | |
| --- | --- | --- | --- | --- | --- | --- |
|  | I | 2 | 3 | 4 | 5 | 6 |
| Fibrinogen mg/dl | 272 | 258 | 231 | 231 | 231 | 258 |
| Plasminogen mg/dl | 18.4 | 12.6 | 17.6 | 18.4 | 18.4 | 19.2 |

I = initial value
2-6 = column fraction (in ml)

The documented results of the diagnostics demonstrate the selectivity and capacity of the synthesized adsorption material.

EXAMPLE 8

The solid-state NMR spectrum of the synthesized adsorption material used in example 7.

Adsorbent/Experimental procedure

The basic material obtained directly from the manufacturer Schott, Mainz as well as the Bioran carrier material synthesized in Example 3:
A: 1-hydroxyethyl-3-oxybutyl-Bioran-disiloxane
B: 1:1 mixture of 1-hydroxyethyl-3-oxybutyl/glycidoxypropyl-Bioran-disiloxane
C: mixture of 1-hydroxyethyl-3-oxybutyl/1,2-dihydroxy-propyl-3-oxypropyl-Bioran-disiloxane
were measured in a C 13-NMR spectrum using 0.5 g sample in each case dried at 50° C. for 14 hours.

| Parameter | |
| --- | --- |
| Instrument: | Bruker AM 400 |
| Measurement method: | CP/MAS (cross-reaction-magic-angle-spinning) |
| Frequency: | 106.1 MHz |
| Number of scans: | 2743 X |
| Amount of sample: | 0.5 g |
| Temperature: | 25° C. |

Figure 1B:
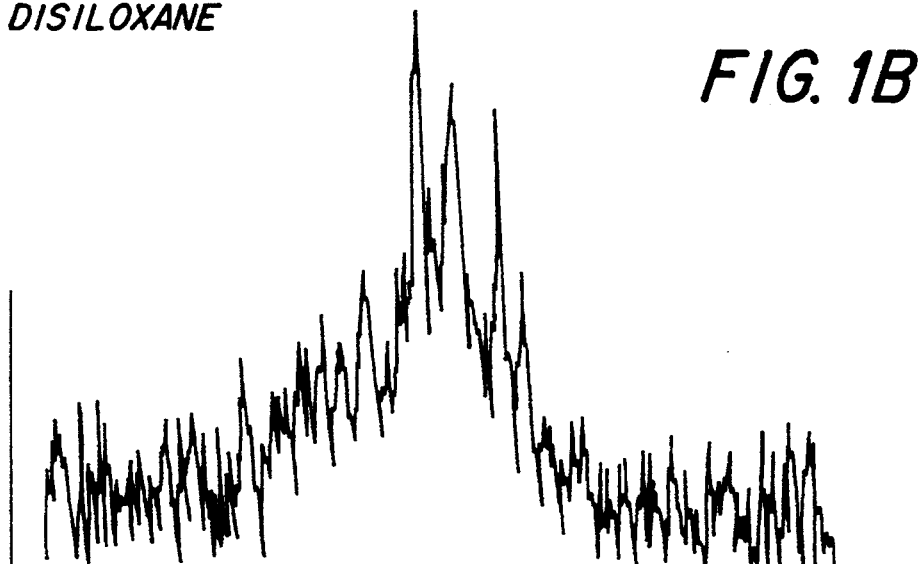
Figure 1C:
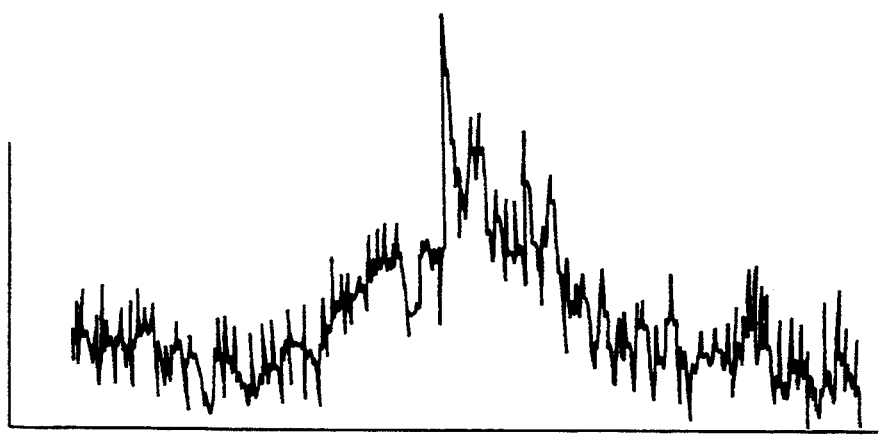

The spectra determined for the compounds A/B/C are shown in FIG. 1. All three compounds differ in their signals. Only the signal peak at 21.8 occurs in all the samples. It represents the -C-C-C-O backbone. This is the primary function which is the basis for all residues (A/B/C). Only the adsorption material (sample C) synthesized according to example 3 fulfils the required quality criteria in relation to its LDL binding capacity. The solid-state NMR spectrum documented under C can be used as a quality criterium for the adsorption material.

EXAMPLE 9

Test for the total cholesterol adsorption capacity of glass beads covered with 1-hydroxyethyl-3-oxybutyl/-glycidoxypropyl groups (manufacturer's name -OH-/epoxide hydrophilic Bioran glass, Schott Co., Mainz), pore size 100–120 nm depending on the species, particle size 60–280 μm.

Adsorbent

Hydrophilic Bioran glasses with different OH/epoxide ratios (1:4, 1:1, 3:1) are used for the synthesis as the starting material (see title for exact product name). The epoxide group is converted into a 1,2-dihydroxy-propyl-3-oxypropyl group by reaction with sulphuric acid (reaction conditions cf. example 3).

The adsorption selectivity and capacity with respect to cholesterol adsorption of the Bioran species with different ratios of 1-hydroxyethyl-3-oxybutyl/1,2-dihydroxypropyl-3-oxypropyl contents on the Bioran-disiloxane matrix is to be investigated.

Experimental procedure

The adsorbent (resin volume=1.6 ml) is washed with redistilled water over a G3 nutsch filter, filled into a disposable chromatography column (5×90 mm) and subsequently equilibrated with 200 ml physiological phosphate buffer (pH 7.4, 20 mmol/l $PO_4^{3-}$).

22 ml human plasma are applied to the column at room temperature (stabilized with 3 units Na heparin, B. Braun-Melsungen AG, per ml whole blood, plasma volume flow 0.5 ml/min).

After 2 ml of pre-eluate, 10 eluates of 1 ml are obtained of which the total cholesterol content, HDL content and LDL content is determined in comparison to the initial concentration (cholesterol oxidase PAP, cholesterol oxidase iodide test).

The adsorption capacity is determined by integrating the areas of the amounts of adsorbed total cholesterol, LDL cholesterol and HDL cholesterol.

TABLE 9

|  | Total cholesterol | | | LDL cholesterol | | | HDL cholesterol | | |
| --- | --- | --- | --- | --- | --- | --- | --- | --- | --- |
|  | absolute | adsorbed | | absolute | adsorbed | | absolute | adsorbed | |
|  | (mg) | (mg) | (%) | (mg) | (mg) | (%) | (mg) | (mg) | (%) |
| 1-hydroxyethyl-3-oxybutyl/1,2-dihydroxy-propyl-3-oxy-propyl-Bioran-disiloxane 100 (ratio 1:4) | 45.6 | 20 | 43.8 | 30.4 | 10 | 32.9 | 9.6 | 0.8 | 7.8 |
| 1-hydroxyethyl-3-oxybutyl/1,2-dihydroxy-propyl-3-oxy-propyl-Bioran-disiloxane 100 (ratio 1:1) | 45.6 | 16.6 | 36.4 | 30.4 | 15.1 | 49.8 | 9.6 | — | — |
| 1-hydroxyethyl-3-oxybutyl/1,2-dihydroxy- | 45.6 | 13.4 | 29.3 | 30.4 | 13.9 | 45.8 | 9.6 | — | — |

TABLE 9-continued

| | Total cholesterol | | | LDL cholesterol | | | HDL cholesterol | | |
|---|---|---|---|---|---|---|---|---|---|
| | abso-lute (mg) | adsor-bed (mg) | (%) | abso lute (mg) | adsor-bed (mg) | (%) | abso-lute (mg) | adsor-bed (mg) | (%) |
| propyl-3-oxy-propyl-Bioran-disiloxane 100 (ratio 3:1) | | | | | | | | | |

The stated ratios 1:4, 1:1 and 3:1 of the 1-hydroxyethyl-3-oxybutyl/1,2-dihydroxypropyl-3-oxypropyl -Bioran-disiloxane samples were not determined analytically but taken from the sample nomenclature of the parent adsorbents. These OH/epoxide ratios of the starting materials was, however, determined by spectroscopical analyses (GC-MS/NMR techniques).

The results show that the binding capacities of the adsorbed amounts of cholesterol depend on the ratio of the 1-hydroxyethyl-3-oxybutyl/1,2-dihydroxypropyl-3-oxypropyl composition. The sample having the reaction ratio (1:1) has the largest capacitiy for LDL cholesterol without binding additional HDL cholesterol.

Although the total cholesterol capacity of the sample having the ratio (1:4) is 7.4% higher than that of the sample with a ratio of (1:1), HDL cholesterol is also bound.

This additional HDL cholesterol binding property is not observed in the sample having the reaction ratio of (1:3) but in this case the total cholesterol capacity is reduced and thus also the LDL cholesterol binding capacity.

The largest adsorption capacity with corresponding LDL cholesterol selectivity is achieved using the reaction ratio of (1:1).

EXAMPLE 10

Synthesis of porous "glass beads" and test for the adsorption capacity of the synthesized adsorber species with whole blood and subsequent regeneration.

Synthesis of porous glass beads

Native porous coarse glass powder Trisopor 200 (VEB Trisola Co., Steinach, pore size 100 nm, particle size 100–200 $\mu$m) is reacted with the corresponding silylation mixture as in example 6.

The 1-hydroxyethyl-3-oxypropyl/glycidoxypropyl-Trisola-disiloxane 200 (ratio 3:1) "glass beads" are washed with distilled water after the treatment with 1N $H_2SO_4$ and equilibrated with physiological phosphate buffer (pH 7.4, 20 mmol/l $PO_4^{3-}$).

Cholesterol adsorption from whole blood with subsequent regenration

The synthesized 1-hydroxyethyl-3-oxypropyl/1,2-dihydroxypropyl-3-oxypropyl-Trisola-disiloxane is used as the adsorbent.

Experimental procedure 18 g (dry weight) synthesized adsorbent is suspended with physiological phosphate buffer (pH 7.5, 20 mmol/l $PO_4^{3-}$) and filled into a cylindrical housing. The device consists of a plastic housing (L=25 mm, $D_i$=38 mm) and the cover at the inflow side has a sieve with a pore size of 20–100 $\mu$m. The adsorption material is equilibrated with phosphate buffer (see above) in the plastic housing.

In the 1st and 2nd run of the adsorption test 160 ml in each case of whole blood (stabilized with 2 mg EDTA/ml whole blood) is pumped over the adsorbent (volume flow 10 ml/min). After rinsing with physiological saline solution it is regenerated with 6M urea between the first and second run (volume 120 ml). The regeneration solution is in turn rinsed out of the adsorber capsule with physiological saline solution before the second run with whole blood.

The adsorption capacities with respect to total cholesterol and LDL cholesterol of the 1st and 2nd run are compared as a criterium for evaluating the ability to regenerate the adsorbent. In addition all relevant clinical-biochemical diagnostic parameters (including urea determination) of the whole blood fractions which have passed through the adsorption material are tested (20 ml eluates).

TABLE 10

| Cholesterol adsorption of Trisola glass beads | | | |
|---|---|---|---|
| | Total cholesterol | | adsorbed total |
| | in the blood pool | absolute in 80 ml whole blood | cholesterol absolute from 80 ml whole blood |
| | c (mg/dl) | c (mg) | c (mg) | (%) |
| 1st run before regeneration | 275 | 220 | 108 | 49.27 |
| 2nd run after regeneration | 275 | 220 | 109 | 49.86 |
| | LDL cholesterol | | adsorbed |
| | in the blood pool | absolute in 80 ml whole blood | LDL cholesterol absolute from 80 ml whole blood |
| | c (mg/dl) | c (mg) | c (mg) | (%) |
| 1st run before regeneration | 175 | 140 | 99 | 69.29 |
| 2nd run after regeneration | 175 | 140 | 101 | 72.14 |

The adsorption material 1-hydroyethyl-3-oxypropyl/1,2-dihydroxypropyl-3-oxypropyl-Trisola-disiloxane does not bind HDL cholesterol.

Amounts of cholesterol are detected in the regeneration solution, the cholesterol adsorption capacity of the 1st and 2nd run with whole blood is identical, i.e. the 6M urea solution is suitable as a regeneration agent. The analysis of the blood picture confirms that the adsorption material is suitable for whole blood. The leukocyte, erythrocyte and thrombocyte values are identical to the values of the blood pool. The differential pictures of the whole blood eluates of the 1st and 2nd adsorption runs show no abnormalities.

EXAMPLE 11

Clinical-biochemical routine diagnostics of whole blood fractions and of whole blood fractions passed over "glass beads".

Adsorbent

An adsorption material synthesized analogous to example 10 consisting of 1-hydroxyethyl-3-oxypropyl/1,2-dihydroxypropyl-3-oxypropyl residues (ratio 3:1) is tested with whole blood.

Experimental procedure 28 g (dry weight) synthesized adsorption material is suspended in equilibration buffer, filled into a cylindrical plastic device with a cover and a sieve cap (L=49 mm, $D_i$=36 mm) and equilibrated. 400 ml whole blood (stabilized with 2 mg EDTA/ml whole blood) is pumped over the adsorption material at a blood volume flow rate of 16 ml/min.

20 ml whole blood eluates are collected for the routine clinical analysis after 100 ml of pre-eluate.

The results of the analysis of the blood picture (Table 12) confirm the biocompatibility of the adsorption material.

The results documented in Table 11 of the routine clinical analysis demonstrate the selectivity as well as the capacity of the synthesized adsorption material.

TABLE 11

| | Concentration | Initial value | Data in ml 1 | | | | | |
| --- | --- | --- | --- | --- | --- | --- | --- | --- |
| | | | 100–200 | 140–160 | 180–200 | 260–280 | 320–340 | 300–400 |
| Sodium | mmol/l | 143 | 145 | 143 | 143 | 142 | 142 | 141 |
| Chloride | mmol/l | 98 | 101 | 98 | 90 | 99 | 99 | 99 |
| Tot. protein | g/dl | 1.2 | 6.5 | 7.2 | 6.9 | 6.9 | 7.3 | 7.2 |
| Tot. chol. | mg/dl | 193 | 43 | 59 | 65 | 78 | 94 | 105 |
| Triglycerides | mg/dl | 101 | 41 | 53 | 50 | 64 | 70 | 80 |
| HDL-Chol. | mg/dl | 49 | 38 | 48 | 50 | 48 | 51 | 49 |
| LDL-Chol. | mg/dl | 124 | 0 | 0 | 3 | 17 | 29 | 56 |
| IgG | mg/dl | 10.8 | 10 | 11.3 | 11.2 | 11.1 | 10.6 | 11.1 |
| IgA | mg/dl | 2.3 | 2.2 | 2.5 | 2.4 | 2.4 | 2.4 | 2.4 |
| IgM | mg/dl | 2 | 1.7 | 2.1 | 2 | 2 | 2.1 | 2 |
| C-1 Compl. | mg/dl | 29 | 19 | 23 | 25 | 25 | 24 | 26 |
| C-3 Compl. | mg/dl | 61 | 53 | 64 | 64 | 64 | 61 | 59 |
| C-4 Compl. | mg/dl | 21 | 18 | 20 | 20 | 21 | 20 | 20 |
| Fibrinogen | mg/dl | 109 | 109 | 107 | 110 | 107 | 106 | 108 |
| AT III | % | 11.1 | 11 | 11.2 | 11.9 | 11.3 | 12.2 | 11 |
| Plasminogen | % | 13.2 | 10.6 | 11.2 | 11.8 | 11.8 | 11.2 | 11.8 |
| Lp (a) | mg/dl | 75 | 4.5 | 9 | 12.3 | 23 | 31.4 | 39.8 |
| Apo Al | mg/dl | 172 | 122 | 172 | 176 | 179 | 178 | 183 |
| Apo B | mg/dl | 78.8 | 3.83 | 11.2 | 19 | 40.7 | 59.7 | 77 |

TABLE 12

| | Concentration | Initial value | Data in ml | | | | | |
| --- | --- | --- | --- | --- | --- | --- | --- | --- |
| | | | 100–200 | 140–160 | 180–200 | 260–280 | 320–340 | 300–400 |
| Leucocytes | Amount µl | 4000 | 3800 | 4100 | 4100 | 4100 | 4100 | 4100 |
| Erythrocytes | Mill/µl | 5.01 | 4.85 | 5.07 | 5.01 | 5.07 | 5.01 | 4.93 |
| Hb | g | 15.2 | 14.5 | 15.2 | 15.2 | 15.3 | 15.2 | 15.1 |
| HK | Vol. % | 43.8 | 42.1 | 44.9 | 43.9 | 44 | 43.4 | 43.4 |
| Thrombocytes | Amount/nl | 272 | 262 | 281 | 286 | 283 | 280 | 274 |
| Lymphocytes | % | 47 | 45 | 36 | 37 | 45 | 48 | 39 |
| Segm.neutrophils | % | 48 | 54 | 61 | 55 | 52 | 45 | 57 |
| Stab cells | % | | | | | | 5 | 3 |
| Monocytes | % | 4 | 1 | 2 | 6 | 3 | 2 | 1 |
| Eosinophilic cells | % | 1 | | 1 | 2 | | | |
| Basophilic cells | % | | | | | | | |
| Atypical cells | % | | | | | | | |

We claim:

1. Adsorption material for the selective removal of Lp(a) lipoprotein, LDL cholesterol and/or vLDL cholesterol from aqueous liquids, said material consisting of:
   a) porous glass beads as a solid carrier material, and
   b) two or more different organic functional groups as ligands which are covalently bound via silanol groups present on their surface;
      i) wherein a first ligand corresponds to formula I $$-(CH_2)_x-O-(CH_2)_y-CH-CH_2OH \qquad (I)$$
$$\phantom{-(CH_2)_x-O-(CH_2)_y-}|\phantom{CH-CH_2OH}$$
$$\phantom{-(CH_2)_x-O-(CH_2)_y-}OH$$

in which x and y denote integers from 1 to 5, and
   ii) wherein a second or third ligand is selected from the group consisting of: ligands corresponding to formula II, $$-(CH_2)_x-O-(CH_2)_y-CH_2-OH \qquad (II)$$

in which x and y denote integers from 1 to 5, and ligands corresponding to formula III, $$-(CH_2)_x-O-(CH_2)_y-CR_1R_2R_3 \qquad (III)$$

in which $R_1$ denotes a methoxy residue, $R_2$ and $R_3$ denote H or a methoxy residue, and x and y denote integers from 1 to 5, and wherein the material has no free silanol groups.

2. The adsorption material as claimed in claim 1, wherein one of the organic functional groups has 1-aminoethyl-3-oxypropyl residues as the ligands.

3. The adsorption material as claimed in claim 1, wherein ligands having the formulae I, II and III are present and bound to the carrier material via silanol groups in a quantity ratio of 1.3: 1: 0.8.

4. The adsorption material as claimed in claim 1, wherein the ligands having the formulae I and II are present bound to the carrier material via silanol groups in a quantity ratio of 1:1, 1:2, 1:3 and 1:4 as well as 2:1, 3:1 and 4:1.

5. The adsorption material as claimed in claim 1, wherein the material has a surface of to 300 m$^2$/g.

6. The adsorption material as claimed in claim 1, wherein the degree of covering of the carrier material with ligands is 2 to 20 μmol/m$^2$.

7. The adsorption material as claimed in claim 1, wherein the glass beads have a particle diameter of 60 to 500 μm and a pore diameter of 50 to 350 nm.

8. A process for the removal of LDL cholesterol and/or vLDL cholesterol and/or Lp(a) lipoprotein from aqueous liquids, wherein the liquid is passed over the adsorption material of claim 1.

9. The method of claim 8 wherein the aqueous liquid is selected from the group consisting of blood, plasma and serum.

10. A method for the determination of the concentration of LDL cholesterol and/or VLDL cholesterol and/or Lp(a) lipoprotein in aqueous liquids, wherein
   a) LDL cholesterol and vLDL cholesterol and Lp(a) lipoprotein are separated chromatographically with the aid of the adsorption material of claim 1; and
   b) after elution from the adsorption material, the concentrations of LDL cholesterol and VLDL cholesterol and Lp(a) lipoprotein are determined.

11. The method of claim 10, wherein the elution is carried out with high molecular saline solution, a glycerol-water mixture or a urea solution.

12. A device for the extracorporeal removal of LDL cholesterol and/or vLDL cholesterol and/or Lp(a) lipoprotein from aqueous liquids, wherein the device consists of a cylindrical housing which is filled with the adsorption material of claim 1 and which is provided with covers at both ends which each have a central inflow or outflow pipe.

13. The device of claim 12, wherein the housing has a diameter of 3 to 20 cm and a length of 1 to 40 cm.

14. The device of claim 13 wherein the housing has a diameter of 5 to 10 centimeters and a length of 10 to 20 centimeters.

15. The device of claim 12 wherein the housing is made of glass or plastic.

16. The device of claim 12, wherein the cover of the housing at the inflow side has a sieve with a pore size of 10 to 300 μm.

17. The device of claim 16 wherein the cover of the housing at the inflow side has a sieve with a pore size of 20 to 100 μm.

18. The device of claim 12, wherein the housing is integrated into a closed circulation in which the aqueous liquid, from which the LDL cholesterol and/or vLDL cholesterol and/or Lp(a) lipoprotein are being removed, is circulated by means of a pump.

19. The device of claim 12, wherein a further cylindrical housing filled with the adsorption material and provided with covers and inflow and outflow pipes is located in the closed circulation.

20. Adsorption material for the selective removal of Lp(a) lipoprotein, LDL cholesterol and/or vLDL cholesterol from aqueous liquids, said material consisting of:
   a) porous glass beads as a solid carrier material, and
   b) two or more different organic functional groups as ligands which are covalently bound via silanol groups present on their surface;
   i) wherein a first ligand corresponds to formula I

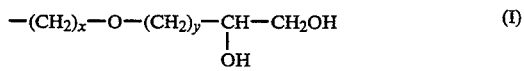

in which x and y denote integers from 1 to 5 and
   ii) a second ligand corresponds to formula II

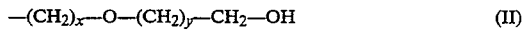

in which x and y denote integers from 1 to 5, and wherein the material has no free silanol groups.

21. The adsorption material as claimed in claim 20, wherein the material contains one or several 1-hydroxyethyl-3-oxybutyl residues as the ligands of formula II.

22. The adsorption material as claimed in claim 20, wherein the material contains one or several 1-hydroxypropyl-3-oxypropyl residues as the ligands of formula II.

23. Adsorption material for the selective removal of Lp(a) lipoprotein, LDL cholesterol and/or vLDL cholesterol from aqueous liquids, said material consisting of:
   a) porous glass beads as a solid carrier material; and
   b) two or more different organic functional groups as ligands which are covalently bound via silanol groups present on their surface;
   i) wherein a first ligand corresponds to formula I

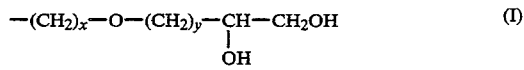

in which x and y denote integers from 1 to 5 and
   ii) a third ligand corresponds to formula III

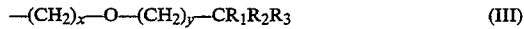

in which
   $R_1$ denotes a methoxy residue,
   $R_2$ and $R_3$ denote H or a methoxy residue, and
   x and y denote integers from 1 to 5, and wherein the material has no free silanol groups.

24. The adsorption material as claimed in claim 23, wherein the material contains one or several 1,1-dimethoxyethyl-3-oxypropyl residues as the ligands of formula III.

* * * * *